Aug. 27, 1968  R. D. JACOBS  3,399,015

MOUNTING MECHANISM FOR ZOOM MAGNIFIER

Filed May 13, 1965

ROBERT D. JACOBS
*INVENTOR*

BY *Frank C. Parker*

ATTORNEY

United States Patent Office

3,399,015
Patented Aug. 27, 1968

3,399,015
MOUNTING MECHANISM FOR
ZOOM MAGNIFIER
Robert D. Jacobs, Livonia, N.Y., assignor to Bausch & Lomb Incorporated, Rochester, N.Y., a corporation of New York
Filed May 13, 1965, Ser. No. 455,374
5 Claims. (Cl. 350—187)

The present invention relates generally to a Hastings type of magnifier and it relates more particularly to the mechanical parts of a zoom or variable powered magnifier of said type.

In the category called technical magnifiers to which the present invention belongs, the prime requisites are lightweight and small size for convenient and handy use. Next in importance, the mounting mechanism must accommodate a high-grade optical system, and particularly in the case of a zoom optical system having a zoom range of more than 2.0 the mechanical design problem is quite formidable.

It is an object of the present invention to provide a novel mounting mechanism for the zoom optical system of a variable power magnifier.

It is a further object to provide such a mounting mechanism which has minimal length and circumferential dimensions, and is so constructed that the magnifier is very light in weight.

A further object is to provide such a device which is easily adaptable to different magnification ranges and is focusable, the mechanism therein being sturdy and easy to handle although not bulky.

Figure 1:
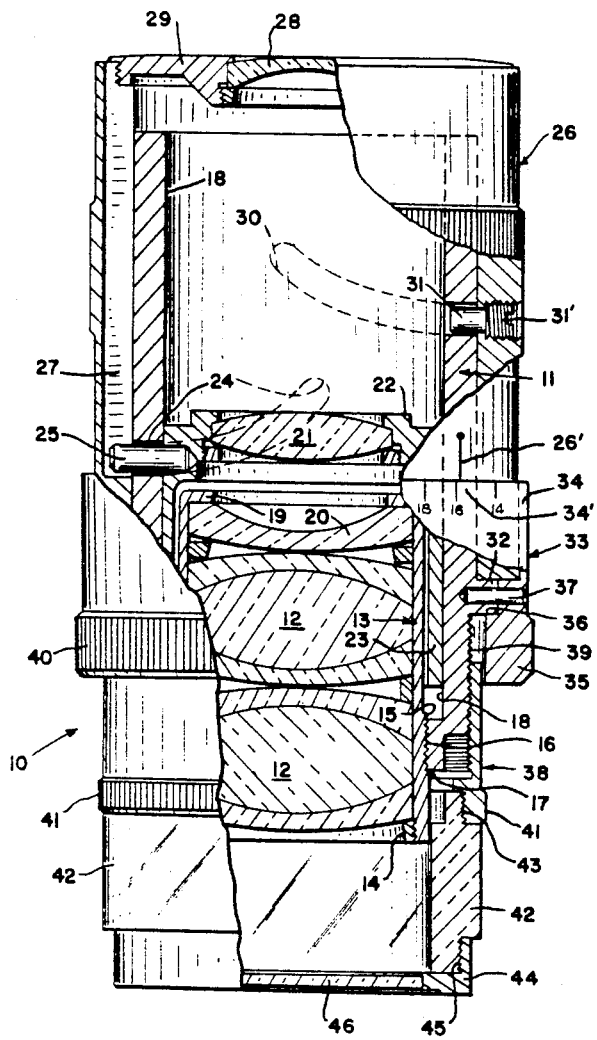
Figure 2:
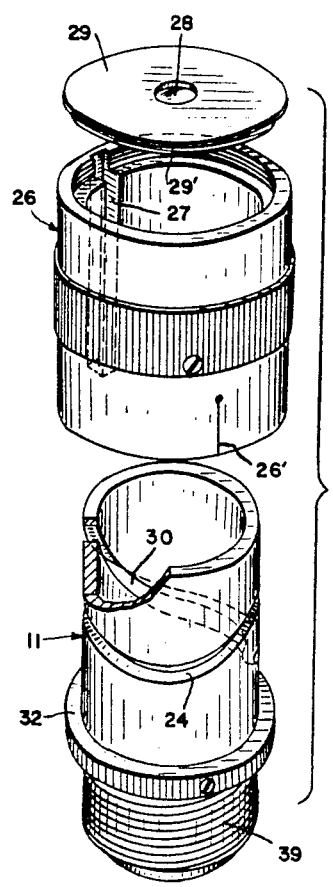

Further objects and advantages are to be found in the form and arrangement of the operating parts and in the details of construction thereof, reference being had for a full disclosure of the device to the following specification and accompanying drawing, wherein:

FIG. 1 is a midsectional view of the magnifier drawn to an enlarged scale with certain parts broken away for the sake of clarity; and FIG. 2 is a perspective exploded view of certain contiguous operating parts of the magnifier.

In the drawing, the magnifier is designated generally by the numeral 10 and it is basically comprised of an objective mounting mechanism and a zoom lens system mounting mechanism which are cooperatively mounted in a body tube 11. Said body tube extends through a major portion of the length of the instrument and in the front or lower end thereof is mounted an objective 12.

According to the present invention, a front lens cell 13 is provided wherein the constituent parts of the objective 12 are secured by a clamp ring 14 against a solid rear abutment so that said objective may be demounted when it is necessary to substitute an objective having a different magnification rating. Said lens cell 13 is demountably secured in the body tube 11 by threads 15 formed thereon which engage with mating threads 16 formed on the lower end of the body tube, the threads 15 terminating in a shoulder 17 whereby the objective 12 is located axially therein.

Upwardly or rearwardly of the threads 15, the front lens cell 13 is reduced in diameter, and rearwardly of the threads 16 an enlarged bore 18 in the body tube 11 is provided so that the adjacent surfaces of the front lens cell and the body tube are radially separated, thus affording a space for a purpose to be described. The rear part of the lens cell 13 is formed with an inturned radial flange 19 and an adjacent lens seat is formed for clamping the front lens member 20 of the aforesaid zoom lens system between the objective 12 and the flange 19.

Above or rearwardly of the front zoom lens member 20 is mounted an intermediate zoom lens member 21 in a lens cell 22 which is externally slidably fitted in the bore 18 of body member 11. Formed on the front side of lens cell 22 is an elongated tubular extension 23 which occupies the aforementioned annular space between the front cell 13 and body tube 11. By such a construction, good axial alignment of the moving lens cell 22 may be assured in all parts of its movement while at the same time reducing the length of the instrument to a minimal dimension.

For actuating said lens cell 22, a suitable cam slot 24 is formed in the upper part of the body tube 11 and an actuating pin 25 which is fixed radially in lens cell 22 projects into and outwardly beyond the cam slot 24 and is fitted slidably therein. Furthermore, an actuating sleeve 26 is provided which is rotatably and slidably fitted onto the outer diameter of the body tube 11. Formed in the inner surface of the actuating sleeve 26 is a longitudinal keyway or slot 27 wherein the outer end of the actuating pin 25 slidably engages so that rotation of the sleeve 26 causes the pin 25 to move the lens cell 22 axially along the cam slot 24.

The rearmost zoom system lens is designated 28 and it is movably mounted with reference to the movable lens 21 and with reference to the stationary body tube 11 on the rear end of the actuating sleeve 26 by means of an end cap 29 wherein it is held in any preferred manner, such as the threads shown at 29'.

For moving the rear zoom lens 28, a second cam slot 30 is formed in the upper wall of the body tube 11, and a second actuating pin 31 is slidably fitted in the slot and is fixedly held in the actuating sleeve 26 by threads 31' formed therein. Since the first and second cam slots 24 and 30 are substantially equal in angular extent but unequal in longitudinal travel or dimensions, the longitudinal slot 27 should be made at least long enough to accommodate the differential zooming movements of the actuating pins 25 and 31.

The above-described actuating mechanism for the movable zoom lenses 21 and 28 is especially designed to provide a satisfactory generous zooming movement of said lenses while nevertheless maintaining small overall dimensions, both lengthwise and radially, the action requiring only the rotation of a single actuation member 26.

In order to hold the body member 11 stationary while the actuating sleeve 26 is rotated, an annular radial flange 32 is formed on the exterior of the member 11 near its lower end, and on the outer diameter of the flange 32 is fixed an outermost sleeve 33. The upper end of the sleeve is constituted of a thin tubular wall 34 whereon is formed a magnification scale 34'. Said tubular wall 34 overlaps and is freely fitted over the lower end of the actuating sleeve 26 on which an index mark 26' is formed. The lower end 35 of the outermost sleeve 33 is radially thickened for increased strength and has a radial shoulder 36 formed therein which longitudinally locates the sleeve. In order to hold the sleeve 33 on the flange 32, and also to angularly locate the magnification scale 34' in proper alignment with the index mark 26', suitable pegs, pins or screws 37 are seated in fitted holes formed in the sleeve and these project snugly into accommodating holes formed radially in said flange.

Combination stand and focusing means are provided whereon the instrument may rest when in use, said means comprising a tubular focusing part 38 which is concentrically attached to the body member 11 by the threaded connection 39 formed on both members. Using such means, focusing may be accomplished by rotating the tubular part 38. Said part 38 is nested beneath the thick part 35 of the outermost sleeve 33 so as to move freely therein, there being sufficient longitudinal space provided between the end of the part 38 and the radial flange 32 to permit ample focusing motion without unduly lengthening the overall dimension of the instrument. Appropriate knurling is provided at 40 on the outermost sleeve 33 and at 41 on the focusing part 38 to improve the ease of operation.

For illuminating the object surface to be observed, part of the stand is formed of light-transmitting material so as to utilize ambient light. The light-transmitting part is made in the form of a ring 42 of glass or transparent plastic material which is attached in any suitable manner such as threads 43 to the tubular part 38. A contact footpiece such as an annular ferrule 44 is secured in any preferred manner such as the threads 45 to the bottom part of the transparent member 42 whereon the instrument rests.

If desired for interchangeable use, a second ferrule 44 is provided having secured in its aperture a transparent scale plate 46, the scale thereof being graduated in suitable units which appear superimposed over the object surface.

It will be understood that the length of the lens cell 13 may be chosen to support other types of objective lenses at their proper working distances, and the form of the cam slots 24 and 20 may be so chosen as to properly move other types of zoom optical systems, the nested and shortened tubular structure above described being retained in the design to reduce the overall length to a minimum.

Although only a single form of mounting mechanism has been shown and described in detail, other forms are possible and changes may be made in the details of construction without departing from the spirit of the invention as defined in the claims here appended.

I claim:

1. The combination in a mounting mechanism for a zoom magnifier having an objecive lens group and an optically aligned zoom lens system of
    a body tube,
    a front lens cell located near the object end of the magnifier for mounting said objective lens group, said cell being spaced away from the inner surface of said tube to form an extended recess therebetween,
    means formed cooperatively on the forward end of the body tube and on the front part of said lens cell for securing the cell in the tube,
    means formed in the rear part of said front lens cell for securing a stationary lens member of said zoom lens system therein,
    an intermediate lens cell wherein a movable lens member of said system is secured, said cell having an elongated annular sleeve formed on the front side thereof which slidably fits the inner surface of the body tube and operates freely within said extended recess,
    a rear lens cell wherein a second movable lens member of said system is secured,
    an actuating sleeve slidably mounted on the rear exterior surface of said body tube and projecting rearwardly therebeyond,
    means fixing said rear lens cell in the rear end of said actuating sleeve so that it moves therewith,
    means operatively forming a longitudinal slot in said inner surface of said actuating sleeve,
    means forming a first curved helical cam slot in the body tube crossing said longitudinal slot near said intermediate lens cell,
    an actuating pin anchored in the intermediate lens cell and extending radially through said first curved helical slot and slidably engaged within said longitudinal slot,
    a pair of non-linear parallel cam surfaces defining a second curved cam slot which is formed in the rear part of said body tube, and
    a second actuating pin fixed in said actuating sleeve and extending into engagement with said second curved slot
    whereby rotation of the actuating sleeve causes the sleeve and the rear lens cell to move axially of the body tube and simultaneously causes the intermediate lens cell to move because of its connection with the longitudinal slot.

2. Mounting mechanism for a zoom magnifier having an objective lens group which functions cooperatively with a zoom lens system to form an image of variable magnification, said mechanism comprising
    a body tube,
    a stationary elongated objective lens cell wherein said objective group is held,
    interengageable means formed cooperatively on the forward end of said tube and on the front part of said cell for securing the cell in the tube, the rear portion of the cell having a smaller diameter such that it is spaced away from the inner surface of said tube,
    a lens seat formed in the rear part of said objective lens cell, said cell being fitted to receive a lens member of said zoom system,
    an intermediate lens cell which is slidably fitted into said tube rearwardly adjacent to said objective cell to hold a second lens member of the zoom system,
    a cylindrical extension formed on the front part of the intermediate lens cell, the outer diameter of which is slidably fitted to the interior surface of said tube coextensively with the space between the front cell and tube and free of said front cell,
    an actuating sleeve journaled on the rear outer surface of said tube and extending therebeyond,
    a rear lens cell constituting an end cap which is fixed in the extended end of said actuating sleeve wherein a movable lens of said zoom system is secured,
    a plurality of contiguous smooth straight surfaces which operatively form an open slot longitudinally in the aforesaid inner surface of the actuating sleeve,
    a pair of mutually spaced cam surfaces which together define a first curved cam slot which is formed in said body tube in the proximity of said intermediate lens cell and extending across said open longitudinal slot,
    an actuating pin anchored in the intermediate lens cell and projecting radially through the first curved cam slot and longitudinal slot to which the pin is slidably fitted,
    a pair of spaced cam surfaces defining a second curved cam slot which is formed in the rear part of the body tube, and
    a second actuating pin fixed radially in said actuating sleeve so as to extend freely into the second cam slot
    whereby rotation of the actuating sleeve causes said sleeve and the rear lens cell to move axially of the body tube and simultaneously causes the intermediate lens cell to move by reason of its connection with said longitudinal slot.

3. Mounting mechanism for a zoom magnifier according to claim 2, further comprising
    an annular flange formed near the midsection of said body tube and on the outer surface thereof, and
    an axially elongated outermost sleeve demountably secured in a fixed position to the outer diameter of said flange and extending on the rear side partly over said actuating sleeve.

4. Mounting mechanism for a zoom magnifier according to claim 2, further comprising,
    a second actuating pin fixed radially in said actuating sleeve so as to extend freely into the non-linear cam slot,
    a stand including a base on which the magnifier rests, said stand including an annular side wall extending over and in contact with the forward portion of said body tube, means cooperatively formed on said forward end and on said annular side wall for effecting focusing motion, an annular flange formed near the midsection and on the outer surface of said body tube, and an axially elongated outermost sleeve demountably secured near its midpoint on the periphery of said annular flange, said sleeve having a front sleeve portion and a rear sleeve portion formed on the front and rear of said sleeve respectively which extend over the adjacent ends of the actuation sleeve and said annular side wall respectively to provide a compact construction.

5. Mounting mechanism for a zoom magnifier according to claim 4 wherein said annular side wall of said stand includes adjacent to said base an annular portion which is formed of light-transmitting material for illuminating the object.

References Cited

UNITED STATES PATENTS

| | | | |
|---|---|---|---|
| 1,883,673 | 10/1932 | Fouquet | 350—255 |
| 3,090,282 | 5/1963 | Angenieux | 350—255 |
| 3,121,134 | 2/1964 | Heinzel | 350—42 |

DAVID H. RUBIN, *Primary Examiner.*

M. J. TOKAR, *Assistant Examiner.*